S. SORENSEN.
DRILL HEAD FOR OIL WELLS.
APPLICATION FILED MAY 18, 1920.

1,394,769.

Patented Oct. 25, 1921.
2 SHEETS—SHEET 1.

Inventor:
Sam Sorensen
By Spear, Middleton, Donaldson & Ball
Attorney

UNITED STATES PATENT OFFICE.

SAM SORENSEN, OF HOUSTON, TEXAS, ASSIGNOR TO C. E. REED.

DRILL-HEAD FOR OIL-WELLS.

1,394,769.   Specification of Letters Patent.   Patented Oct. 25, 1921.

Application filed May 18, 1920. Serial No. 382,356.

*To all whom it may concern:*

Be it known that I, SAM SORENSEN, a citizen of the United States, and resident of Houston, Texas, have invented certain new and useful Improvements in Drill-Heads for Oil-Wells, of which the following is a specification.

My invention relates to drill heads for oil wells and one object of the invention is to provide a drill head having capacity to drill through strata of soft formation as may exist between rock layers and in broken formation of clay and boulders, as well as through rock formations themselves, the said drilling head being provided with roller bits or cutters and also with a fish tail cutter.

The invention is shown in the accompanying drawings, of which:

In these drawings, 1 indicates a drill head, this being representative of any suitable form of head with which my invention may be used, and it will be understood that the forms of the various parts shown herein are employed in an illustrative way and are not to be regarded as restrictive upon the scope of my invention.

Figure 1:
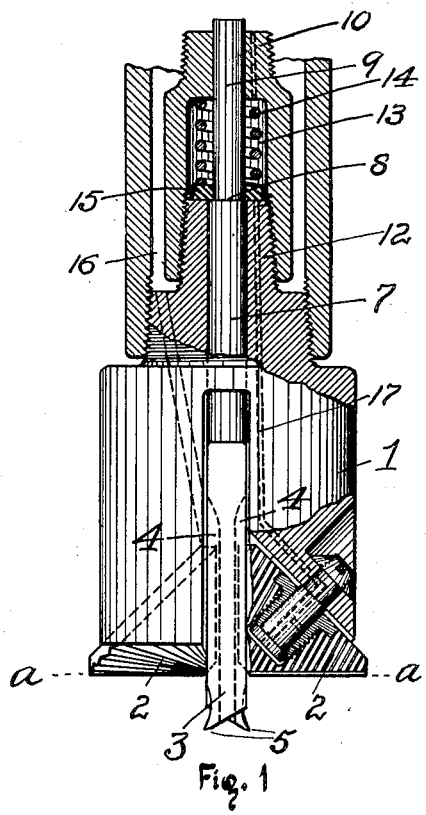
Figure 1 is a side elevation partly in section of a drill head embodying my invention.
Figure 3:
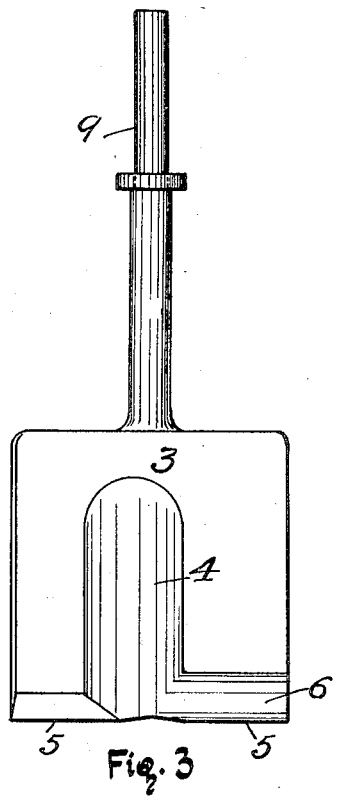
Fig. 3 is a side view of a fish tail cutter of special form adapted for association with the roller bits.
Figure 4:
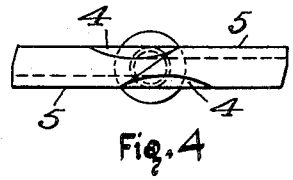
Fig. 4 is a bottom plan view of the fish tail cutter.
Figure 2:
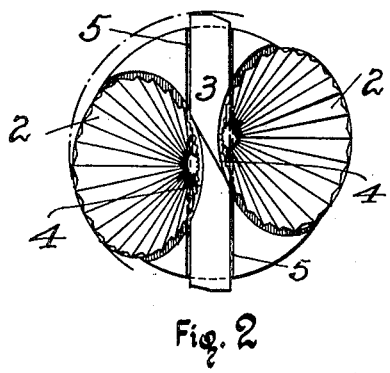
Fig. 2 is a bottom plan view.

In the particular embodiment of my invention illustrated conical roller bits or cutters 2 are employed suitably journaled with the axis at an inclination so as to present substantially horizontal cutting surfaces or edges on the line $a, a$, Fig. 1, and between these cutter I employ a fish tail cutter 3, which is generally of ordinary form, differing, however, in certain respects as will be clear from the following description. This fish tail cutter is provided with depressions or recesses 4, extending in its opposite faces, these recesses being curved and positioned so as to receive the adjacent surfaces of the conical cutters. The recesses are slightly out of line with each other, this being due to the out-of-line relation of the conical cutters as shown in Fig. 2.

The formation of the fish tail cutter at its lower edge is substantially as ordinarily employed, presenting cutting edges 5, facing in opposite directions and recesses 6 in the opposite faces of the fish tail bit. The shank or spindle 7 of the fish tail cutter extends up through the drill head and is shouldered at 8 to provide a reduced stem portion 9 which finds a bearing at its upper end in a collar 10. The collar is internally screwed upon the reduced upper end 12 of the drill head. The collar is recessed at 13 and a spring 14 bears upon a washer 15 which in turn bears upon the shoulder 8 of the fish tail spindle. The upper end of the spring bears upon the top of the recess in the collar and the arrangement is such that upon meeting strong resistance such as offered by a layer of rock or a boulder, the fish tail cutter will recede upwardly the spring yielding for this purpose, and its lower end or cutting edge will assume a position substantially in the plane of the lower cutting faces of the conical bits so that these conical cutters will then be available for action upon the rock or other hard formation. In boring through strata of softer material the fish tail cutter will automatically become available, the spring 14 acting to force it down below the cutting faces of the conical parts.

Water passages are employed to conduct the flushing water to the cutters, these being represented at 16, and oil passages indicated at 17 conduct oil to the journals of the rollers.

The recesses 4 in the sides of the fish tail cutter permit the rollers to be positioned close together so that a practically continuous cutting face is provided at the lower end of the drill head extending from side to side. While this recess arrangement permits the roller bits to be located close together it also permits the use of a fish tail cutter plate of ample thickness at those parts thereof which perform the cutting operation.

Figure 5:
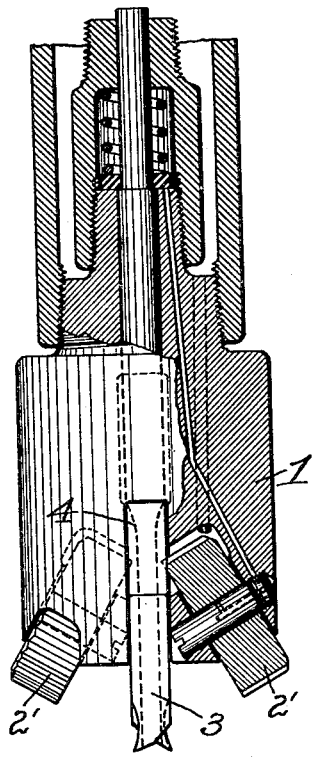
Figs. 5 and 6 are views similar to Figs. 1 and 2 of the drill head having a different form of roller cutters.
Figure 7:
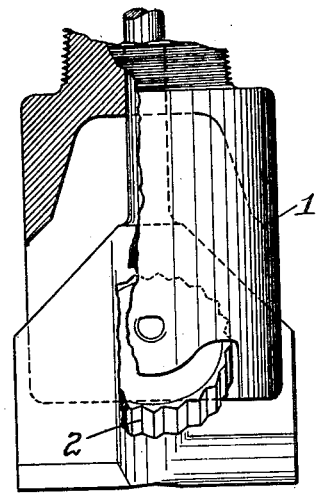
Fig. 7 is a part elevation and part sectional view of Fig. 5.
Figure 6:
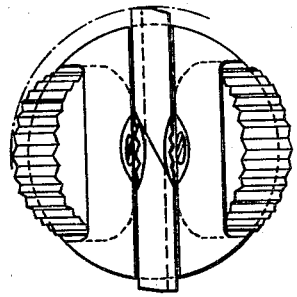

Fig. 5 shows roller cutters 2' of a different form from those shown in Figs. 1 and 2, namely, disk shaped cutters having toothed peripheries.

These cutters are arranged on inclined journal pins and they incline downwardly and outwardly.

The cutter 3, while not of the exact shape of a fish tail, is so styled herein for convenience of expression.

I claim as my invention:

1. A deep well rotary drilling apparatus comprising a head, roller cutting means mounted thereon, and a cutter yieldingly mounted on the head and normally cutting at a point beyond the roller cutting means and receding to bring said roller cutting means into action on encountering hard material, substantially as described.

2. A deep well rotary drilling apparatus comprising a head, roller cutting means mounted thereon, and a cutter yieldingly mounted on the head and normally cutting at a point beyond the roller cutting means and receding in a direction lengthwise of the head to bring said roller cutting means into action on encountering hard material, substantially as described.

3. A deep well rotary drilling apparatus comprising a head, roller cutting means mounted thereon, and a cutter yieldingly mounted on the head and normally cutting at a point beyond the roller cutting means and receding to bring said roller cutting means into action on encountering hard material, said yielding cutter being arranged centrally of the lower end of the head and between members of said roller cutting means, substantially as described.

4. A deep well rotary drilling apparatus comprising a head, roller cutting means mounted thereon, and a cutter yieldingly mounted on the head and normally cutting at a point beyond the roller cutting means and receding to bring said roller cutting means into action on encountering hard material, said yielding cutter being of blade form.

5. A deep well rotary drilling apparatus comprising a head, recessed to receive roller cutters at each side of the center of its lower end, and a cutter of blade form having its cutting edge normally in a plane below the cutting plane of the roller cutters, and arranged centrally of the head, said blade like cutter being yieldingly mounted to recede and transfer the work to the roller cutters on encountering hard material, substantially as described.

6. In combination in a rotary drill head, roller cutters mounted therein, to cut at the bottom of the hole, a blade cutter having a shank and a spring at the upper end of the shank for pressing the blade cutter normally downwardly, to project beyond the roller cutters, said blade yielding upwardly against the spring pressure to transfer the work to the roller cutters on encountering hard material, substantially as described.

In testimony whereof I affix my signature.

SAM SORENSEN.